(12) United States Patent
Sood et al.

(10) Patent No.: US 6,401,775 B1
(45) Date of Patent: Jun. 11, 2002

(54) HANDY DEVICE FOR RETRIEVING A VEHICLE STUCK IN A SNOW BANK

(76) Inventors: Sandeep Sood; Beena Gaind Sood, both of 5243 Royal Vale La., Dearborn, MI (US) 48126

( * ) Notice: Subject to any disclaimer, the term of this patent is extended or adjusted under 35 U.S.C. 154(b) by 0 days.

(21) Appl. No.: 09/748,366

(22) Filed: Dec. 26, 2000

(51) Int. Cl.[7] .............................................. B60C 11/00
(52) U.S. Cl. ................................................. 152/225 C
(58) Field of Search .......................... 152/225 R, 226, 152/227, 228, 229, 230, 225 C

(56) References Cited

U.S. PATENT DOCUMENTS

| | | | | |
|---|---|---|---|---|
| 1,350,966 A | * | 8/1920 | Glover | 152/225 R |
| 2,664,934 A | * | 1/1954 | Safran | 152/225 R |
| 3,756,301 A | * | 9/1973 | Belknap | 152/225 R |
| 3,850,216 A | | 11/1974 | Sanvitale | |
| 3,935,891 A | * | 2/1976 | McCloud et al. | 152/225 R |
| 4,036,272 A | | 7/1977 | Lee | |
| 4,098,313 A | * | 7/1978 | Ingerson | 152/225 R |
| 4,848,430 A | | 7/1989 | Lenet | |
| 5,156,695 A | * | 10/1992 | Martin | 152/225 R |
| 5,360,045 A | * | 11/1994 | Campbell | 152/225 C |
| 5,513,684 A | * | 5/1996 | Laub | 152/225 R |

* cited by examiner

Primary Examiner—S. Joseph Morano
Assistant Examiner—Long Bao Nguyen

(57) ABSTRACT

A handy device for retrieving a vehicle stuck in a snow bank with a metal shoe about the width of a tire and roughly conforming the radial curvature of the tire, multiple conical sharp or blunt projections on the under surface of the metal shoe that increase traction on snow or ice, a side plate attached to one side of the shoe at one end and with a hole at the other end, and, a right angled bar, one side of which has multiple small holes and passes through the hole in the side plate and other side of which passes through the existing gaps in the wheel rim, and, a metal pin that locks the angled bar into the hole in the side plate. A preferred embodiment includes wherein the side plate and the angled bar are laminated with plastic or such poor conductor of cold. An alternative embodiment includes wherein the side plate is hinged to the metal shoe on one side with or without the other side fixed through a hinge to the rim of the wheel.

6 Claims, 2 Drawing Sheets

HANDY DEVICE FOR RETRIEVING A VEHICLE STUCK IN A SNOW BANK

CROSS REFERENCE TO RELATED APPLICATIONS

None

STATEMENT REGARDING FEDERAL SPONSORED R & D

Not Applicable

REFERENCE TO SEQUENCING LISTING

None

BACKGROUND OF THE INVENTION

This invention relates generally to the field of automobiles, and particularly to automobile tires and specifically to a handy device for retrieving a vehicle stuck in a snow bank.

Automobile tires often skid in icy conditions or in snow. To prevent cars from skidding special snow tires have been designed for use in places where snow covers the roads for long periods of time. These expensive tires have to be installed in snow season and then removed during warmer season. Snow chains are a cheaper alternative and are mounted on regular tires for use when roads are covered with snow. However, over bare areas of the road these are noisy and may be damaging to the road. Snow belts are made of rubber and overcome some of the problems of snow chains, however, like snow chains these have to be mounted prior to the trip. This means that the tire has to be removed, the snow chain or belt mounted on to it and then the tire is replaced on the vehicle.

While the above are useful alternatives where snow season is long or facilities to clear the roads are poor, in the present day metropolitan cities often most of the snow is cleared before the rush hour making snow tires, snow belts or snow chain redundant for use. Yet there may be patches of icy snow on the road or during active sleet or snow fall that cause the vehicles to skid and result in cars getting stuck in snow banks at the edge of the road. The tires may not have sufficient traction to give enough force to retrieve the car from such a situation. Traditionally salt may be sprinkled to melt ice under the tires or gravel is used to improve traction. While this may provide sufficient traction in some instances, the slush over the ice often makes gravel ineffective in improving traction and in very cold conditions salt may not sufficiently melt the ice or may take a long time to work. Tire attachment for traction on ice or snow is a device that may be attached on to a tire to improve traction, however, this device is cumbersome to use and requires an inflatable tube to be positioned on the inner rim of the wheel. The sure grip winter tire traction device comprises a section of an old tire with studs that extend through it such that they interlock with the treads of the tire when this section is mounted on the tire. In icy conditions the treads of a tire are often packed with snow or ice and mounting this device is difficult.

SUMMARY OF THE INVENTION

The primary object of the invention is to increase traction of the wheel to allow retrieving a vehicle stuck in a snow bank using a handy portable device.

Another object of the invention is that it does not require previous training or force to mount or un-mount the device.

Another object of the invention is that unlike existing devices like the snow chains or snow belts, it can be mounted at the time when the vehicle is stuck in snow.

A further object of the invention is that it will save the time and expense involved in getting a tow truck especially in adverse weather conditions.

Yet another object of the invention is that it can be used without altering the construction of the tire or wheel.

Other objects and advantages of the present invention will become apparent from the following descriptions, taken in connection with the accompanying drawings, wherein, by way of illustration and example, an embodiment of the present invention is disclosed.

A handy device for retrieving a vehicle stuck in a snow bank comprising: a metal shoe about the width of a tire and roughly conforming the radial curvature of the tire, multiple conical sharp or blunt projections on the under surface of the metal shoe that increase traction on snow or ice, a side plate that is attached to one side of the shoe at one end, and, with a hole at the other end; a right angled bar, one side of which has multiple small holes and passes through the hole in the side plate and other side of which passes through the existing gaps in the wheel rim; and, a metal pin that locks the angled bar into the hole in the side plate.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
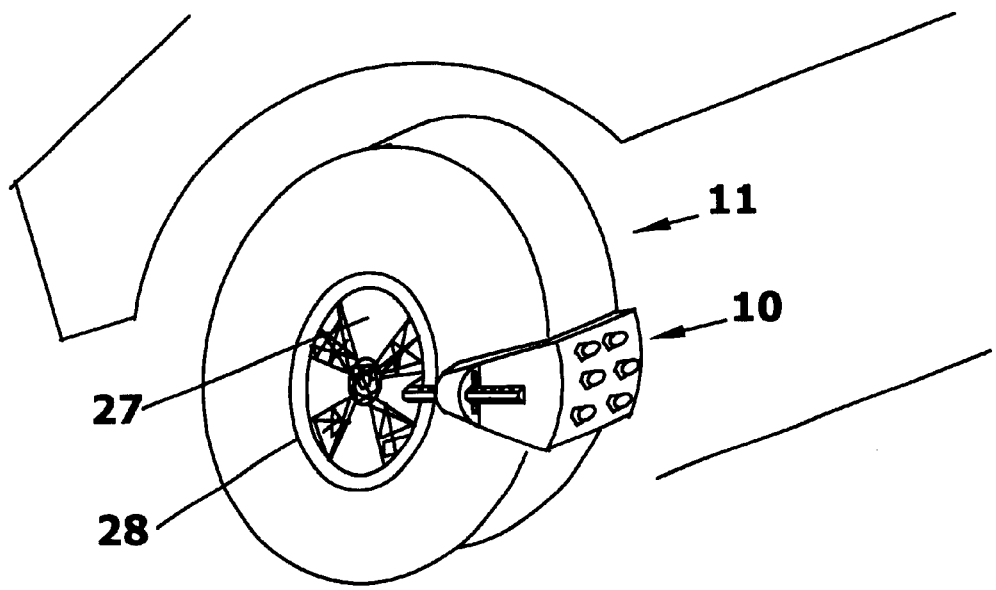
FIG. 1 is a perspective view of the invention.
Figure 2:
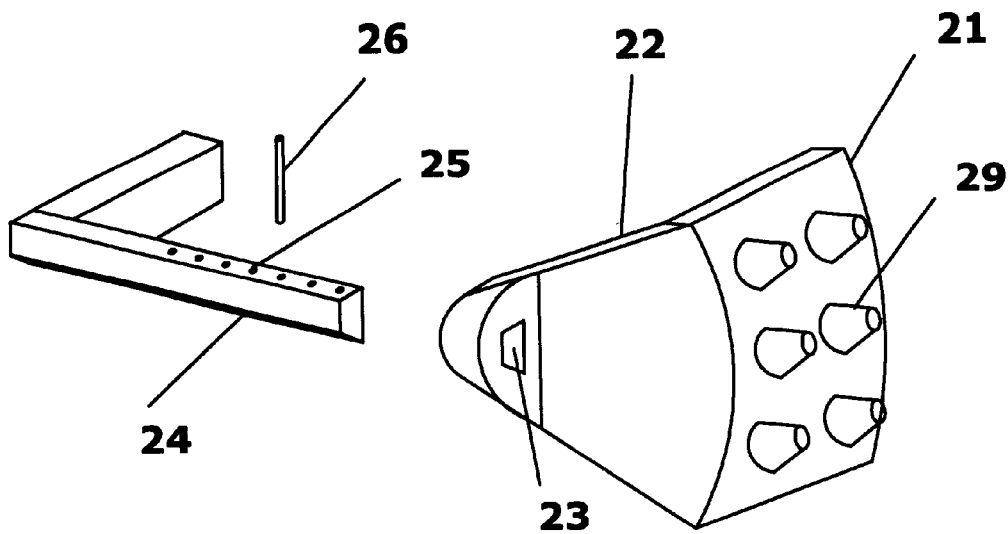
FIG. 2 is an exploded view of the invention.

Turning first to FIG. 1, there is shown the handy device, 10, mounted on to one tire 11 of the automobile. Typically the device is to be mounted on both the power tires of the vehicle (front or back tires) In accordance with the present invention, FIG. 2 shows the components of the device. The metal shoe 21 is roughly the width of the tire and conforming to the radial curvature of the tire. It is fixed to the side plate 22 that has a hole 23. The hole 23 is square or any shape other than circular to avoid rotation of the bar 24 that has the same cross-section shape as the hole. Further the bar 24 has an angle and one side of the angle that goes into the hole 23 during mounting has small holes 25 into which a metal pin 26 can be inserted to lock and complete the mounting after the other side of the angled bar in inserted into the gap 27 in the rim 28 of the wheel. To accomplish an important function of the invention, there is shown in FIG. 2 the projections 29 that may be sharp or blunt on the under surface of the metal shoe 21 to provide the necessary traction on ice. The side plate 22 and the angled bar 24 are laminated with plastic to help with easy handling in freezing weather.

Figure 3:
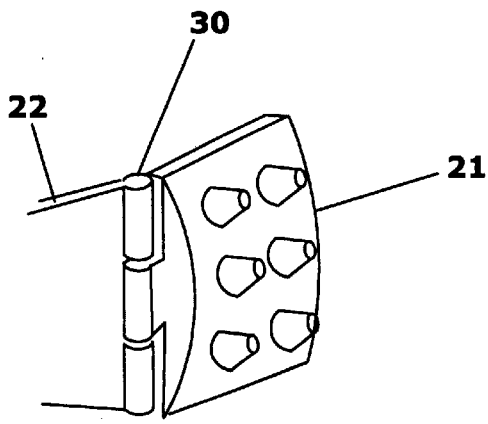
FIGS. 3, 4 & 5 show the alternative embodiments.
Figure 4:
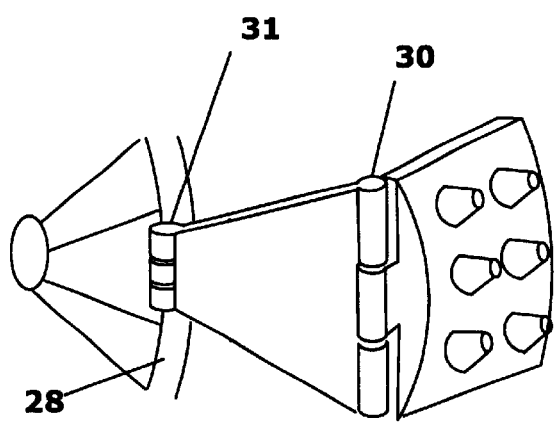

In an alternative embodiment, as is shown in FIG. 3, the side plate 22 may have a hinge 30 at it's attachment to the metal shoe 21 so that it may be folded for storage. Alternatively, as is shown in FIG. 4 the side plate 22 may come installed on a hinge 31 fixed to the wheel rim, such that the entire assembly is folded and may be opened up manually or automatically deployed when needed from within the vehicle using a motorized or hydraulic system.

Figure 5:
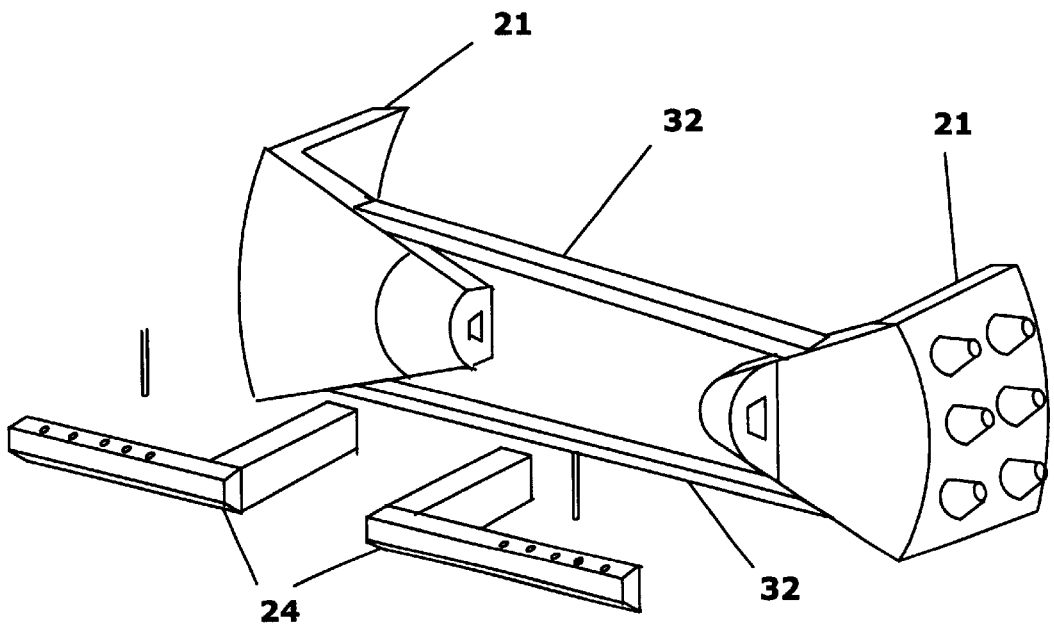

Likewise, as is shown in FIG. 5, to provide additional purchase on the wheel and traction on ice, the two devices may come mounted on a platform 32, so that when mounted there are two metal shoes 21 at diametrically opposite sides of the wheel.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A handy device for retrieving a vehicle stuck in a snow bank comprising:

metal shoe about the width of a tire and roughly conforming to the radial curvature of the tire;

multiple conical sharp or blunt projections on the under surface of the metal shoe that increase traction on snow or ice;

side plate attached to one side of the shoe at one end and with a hole at the other end;

right angled bar, one side of which has multiple small holes and passes through the hole in the side plate and other side of which passes through the existing gaps in the wheel rim; and metal pin that locks the angled bar into the hole in the side plate.

2. A handy device for retrieving a vehicle stuck in a snow bank as claimed in claim 1 wherein the cross-section of the said hole in the side plate is square or any shape other than circular.

3. A handy device for retrieving a vehicle stuck in a snow bank as claimed in claim 1 wherein said angled bar has the same cross-sectional shape as the hole in the side plate.

4. A handy device for retrieving a vehicle stuck in a snow bank as claimed in claim 1 wherein said side plate and the said angled bar are laminated with plastic or such poor conductor of cold.

5. A handy device for retrieving a vehicle stuck in a snow bank as claimed in claim 1 wherein said side plate is hinged to the metal shoe.

6. A handy device for retrieving a vehicle stuck in a snow bank as claimed in claim 1 wherein said side plate is hinged to the rim of the wheel on one side and the metal shoe on the other side and may be deployed automatically using a power system.

* * * * *